US011949649B2

(12) United States Patent
Hamamoto

(10) Patent No.: US 11,949,649 B2
(45) Date of Patent: Apr. 2, 2024

(54) DEVICE MANAGEMENT APPARATUS

(71) Applicant: SHARP KABUSHIKI KAISHA, Sakai (JP)

(72) Inventor: Masanori Hamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/976,545

(22) Filed: Oct. 28, 2022

(65) Prior Publication Data
US 2023/0140750 A1  May 4, 2023

(30) Foreign Application Priority Data
Oct. 29, 2021 (JP) .................................. 2021-177944

(51) Int. Cl.
*H04L 61/3015* (2022.01)
*H04L 41/22* (2022.01)
*H04L 67/141* (2022.01)

(52) U.S. Cl.
CPC .......... *H04L 61/3015* (2013.01); *H04L 41/22* (2013.01); *H04L 67/141* (2013.01)

(58) Field of Classification Search
CPC ............... H04L 61/3015; H04L 67/141; H04L 67/5038; H04L 41/22
See application file for complete search history.

(56) References Cited

U.S. PATENT DOCUMENTS

| 2013/0159541 A1* | 6/2013 | Yu ........................ H04L 41/0886 709/229 |
| 2014/0099928 A1* | 4/2014 | Caldwell ............... H04W 12/12 455/411 |
| 2015/0127825 A1* | 5/2015 | Johannsen ............. H04L 67/02 709/224 |

FOREIGN PATENT DOCUMENTS

JP          2016-092821 A        5/2016

OTHER PUBLICATIONS

Yaseen, Qussai, and Yaser Jararweh. "Building an intelligent global IoT reputation and malicious devices detecting system." Journal of Network and Systems Management 29.4: 45. (Year: 2021).*

(Continued)

*Primary Examiner* — John M MacIlwinen
(74) *Attorney, Agent, or Firm* — ScienBiziP, P.C.

(57) ABSTRACT

A device management apparatus includes a communicator transmitting and receiving various types of data to and from the device; a management ID issuer issuing a unique management ID to the device; a storage that stores device specifying information of the device, the device specifying information including the management ID and predetermined device identification information; a display displaying, in a list of devices to be managed, the device to which the management ID is issued; and a controller controlling the communicator, the management ID issuer, the storage, and the display, where when the communicator has received a connection request from a device via the network, the controller judges whether the device has a management ID, and if the device has no management ID, the controller controls the management ID issuer to issue a unique management ID to the device and controls the communicator to transmit the unique management ID.

6 Claims, 13 Drawing Sheets

(56) References Cited

OTHER PUBLICATIONS

Kumar, Pankaj, and Lokesh Chouhan. "A secure authentication scheme for IoT application in smart home." Peer-to-Peer Networking and Applications 14: 420-438. (Year: 2021).*
Sakamoto, K. English translation of JP2016092821A. (Year: 2016).*
Hong et al. English translation of CN103858380A. (Year: 2014).*
Hiroyuki, C. English translation of JP2007336509A. (Year: 2007).*

* cited by examiner

FIG. 7A

| | | MANAGEMENT ID | MODEL NAME | IP ADDRESS | SERIAL NUMBER |
|---|---|---|---|---|---|
| ☐ | | | | | |
| ☐ | ⚠ | 0000001 | PN-Y436 | xxx.xxx.xxx.2 | D111111 |
| ☐ | | 0000002 | PN-Y436 | xxx.xxx.xxx.3 | D111112 |
| ☐ | | 0000003 | PN-Y436 | xxx.xxx.xxx.4 | D111113 |
| ☐ | | 0000004 | PN-Y436 | xxx.xxx.xxx.5 | D111114 |
| ☐ | ⚠ | 0000005 | PN-Y436 | xxx.xxx.xxx.6 | D111111 |

SYSTEM SETTING > CONNECTED DEVICE LIST
CONNECTED DEVICE LIST

FIG. 7B

SYSTEM SETTING > CONNECTED DEVICE LIST
CONNECTED DEVICE LIST

| | | MANAGEMENT ID | MODEL NAME | IP ADDRESS | SERIAL NUMBER |
|---|---|---|---|---|---|
| ☐ | | | | | |
| ☐ | ⚠ | 0000001 | PN-Y436 | xxx.xxx.xxx.2 | D111111 |
| ☐ | | 0000002 | PN-Y436 | xxx.xxx.xxx.3 | D111112 |
| ☐ | | 0000003 | PN-Y436 | xxx.xxx.xxx.4 | D111113 |
| ☐ | | 0000004 | PN-Y436 | xxx.xxx.xxx.5 | D111114 |
| ☐ | ⚠ | 0000005 | PN-Y436 | xxx.xxx.xxx.6 | D111111 |

SAME DEVICE IS LIKELY REGISTERED UNDER DIFFERENT MANAGEMENT ID.
PLEASE CLICK WARNING ICON FOR MORE DETAILS.

| | | MANAGEMENT ID | MODEL NAME | IP ADDRESS | SERIAL NUMBER |
|---|---|---|---|---|---|
| ☐ | | | | | |
| ☐ | ⊗ | 0000001 | PN-Y436 | xxx.xxx.xxx.2 | D111111 |
| ☐ | ⊗ | 0000001 | PN-Y436 | xxx.xxx.xxx.3 | D111112 |
| ☐ | | 0000003 | PN-Y436 | xxx.xxx.xxx.4 | D111113 |
| ☐ | | 0000004 | PN-Y436 | xxx.xxx.xxx.5 | D111114 |
| ☐ | | 0000005 | PN-Y436 | xxx.xxx.xxx.6 | D111115 |

SYSTEM SETTING > CONNECTED DEVICE LIST

CONNECTED DEVICE LIST

FIG. 10B

SYSTEM SETTING > CONNECTED DEVICE LIST

CONNECTED DEVICE LIST

| | | MANAGEMENT ID | MODEL NAME | IP ADDRESS | SERIAL NUMBER |
|---|---|---|---|---|---|
| ☐ | | | | | |
| ☐ | ⊗ | 0000001 | PN-Y436 | xxx.xxx.xxx.2 | D111111 |
| ☐ | ⊗ | 0000001 | PN-Y436 | xxx.xxx.xxx.3 | D111112 |
| ☐ | | 0000003 | PN-Y436 | xxx.xxx.xxx.4 | D111113 |
| ☐ | | 0000004 | PN-Y436 | xxx.xxx.xxx.5 | D111114 |
| ☐ | | 0000005 | PN-Y436 | xxx.xxx.xxx.6 | D111115 |

THERE IS A POSSIBILITY OF ACCESS FROM UNAUTHORIZED DEVICE. PLEASE CLICK WARNING ICON FOR MORE DETAILS.

FIG. 13

DEVICE MANAGEMENT APPARATUS

BACKGROUND OF THE INVENTION

Field of the Invention

The present disclosures relates to a device management apparatus, and more specifically to a device management apparatus that manages a plurality of devices connected via a network.

Description of the Background Art

Information for specifying devices includes unique information of a device, such as a model name and a serial number, and devices have been identified using such unique information.

However, for example if there are devices having a same model name and a same serial number in the market, such devices are likely treated as a same device. As a result, information inconsistency may occur for the devices, or an operation may be directed to an unintended device.

Related to such a problem, a technology has been proposed, in which a plurality of pieces of data, having been received from a network device to be managed, are managed in association with a device specifying number of the device, so that the device can be distinguished even when there are duplicate device identification numbers.

In many known device specifying methods, judgment is made by acquiring information unique to devices, such as a media access control (MAC) address and a global internet protocol (IP) address.

However, such information cannot be acquired from some types of devices, such as a multifunction peripheral (MFP) and a display, and different information is used as information to identify devices.

In such a case, possibility of duplicates cannot be denied, if merely making judgement using a combination of identification information included in a device, such as a model name and a serial number, for example, and therefore management inconsistency or an instruction issuance to an unintended device may occur.

The present disclosure has been made in view of the above-described circumstances, and an object thereof is to provide a device management apparatus capable of managing any plurality of devices that have duplicate device identification information, such as a model name and a serial number, by distinguishing between the plurality of devices.

SUMMARY OF THE INVENTION (1) The present disclosure provides a device management apparatus that manages an external device connected via a network, the device management apparatus including: a communicator that transmits and receives various types of data to and from the device; a management identification (ID) issuer that issues a unique management ID to the device; a storage that stores device specifying information of the device, the device specifying information including the management ID and predetermined device identification information; a display that displays, in a list of devices to be managed, the device to which the management ID is issued; and a controller that controls the communicator, the management ID issuer, the storage, and the display, where when the communicator has received a connection request from a device via the network, the controller judges whether the device has a management ID, based on the device specifying information acquired from the device, and if the device has no management ID, the controller controls the management ID issuer to issue a unique management ID to the device and controls the communicator to transmit the unique management ID.

According to the present disclosure, a device management apparatus can be realized by which, even if there are a plurality of devices, having duplicate device identification information, such as a model name and a serial number, such devices can be managed by being distinguished therebetween, by issuance of a unique management ID to each device.

BRIEF DESCRIPTION OF THE DRAWINGS

FIGS. 7A and 7B are respectively an explanatory diagram illustrating an example of a connected device list displayed on a display of the device management apparatus illustrated in FIG. 1. FIG. 7A illustrates an example of a screen on which a mouse cursor is not overlayed on a warning icon, whereas FIG. 7B is an explanatory diagram illustrating an example of a warning message to be displayed when a mouse cursor is overlayed on the warning icon.

FIG. 8 is an explanatory diagram illustrating an example of a message in unifying management IDs, to be displayed on the display of the device management apparatus illustrated in FIG. 1.

FIGS. 10A and 10B are respectively an explanatory diagram illustrating an example of a connected device list displayed on the display of the device management apparatus illustrated in FIG. 1. FIG. 10A illustrates an example of a screen on which a mouse cursor is not overlayed on a warning icon, whereas FIG. 10B is an explanatory diagram illustrating an example of a warning message to be displayed when a mouse cursor is overlayed on the warning icon.

FIG. 13 is an explanatory diagram illustrating an example of setting of device identification information to be displayed on the display of the device management apparatus illustrated in FIG. 1.

DESCRIPTION OF THE PREFERRED EMBODIMENTS

Figure 1:
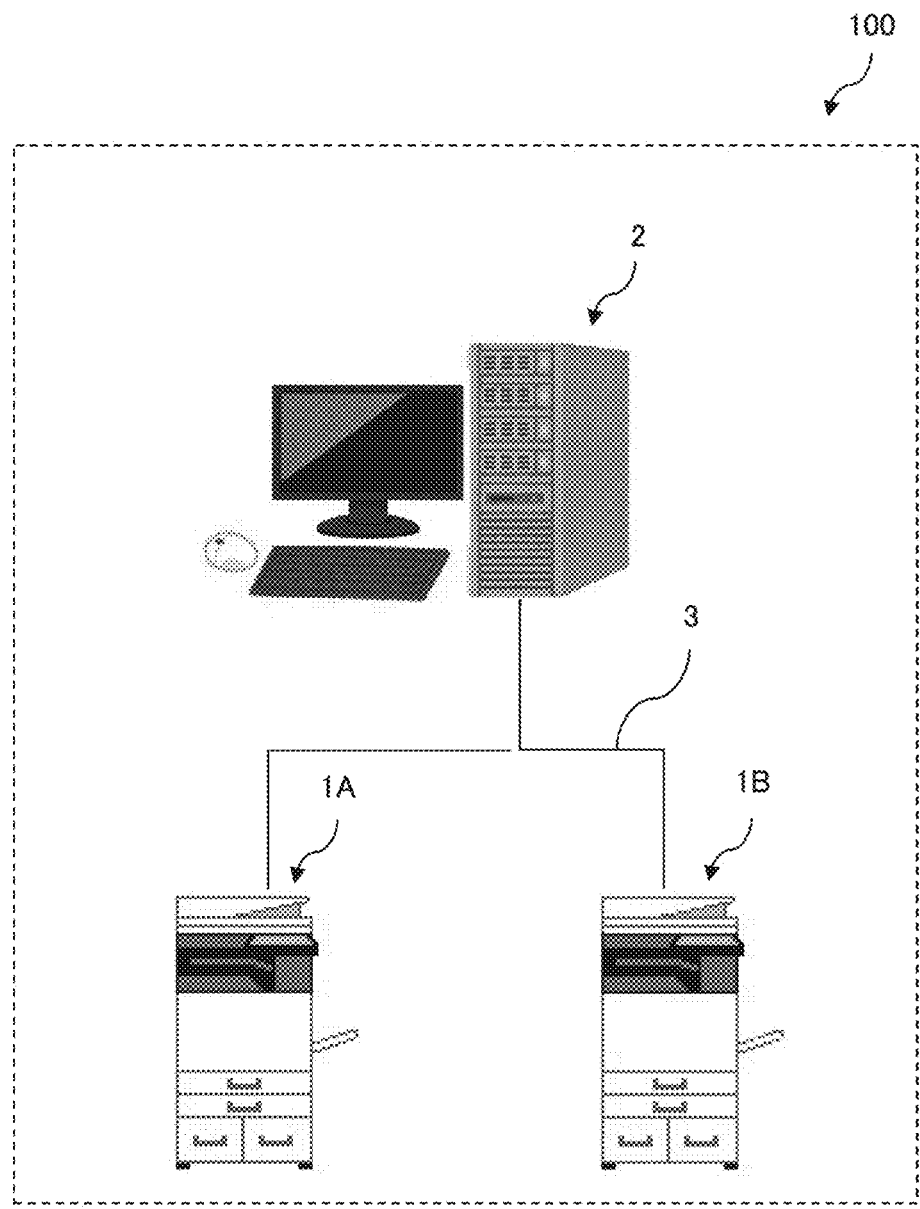
FIG. 1 is an explanatory diagram illustrating a schematic configuration of a device management system that includes a device management apparatus according the present disclosure and digital multifunction peripherals.

In the present disclosure, "predetermined device identification information" represents information unique to a device, which is exemplified by predetermined information on a device, such as a model name, a serial number, and the like, of a device.

"Device identification information" represents such information acquirable by a device management apparatus via an external network, which is selected by a user.

"Device specifying information" is information for specifying a device, and includes information such as device identification information, and management ID information issued and assigned to each device by the device management apparatus. Please note that, in a case of a device for which no management ID information is issued, the device specifying information is the same as the device identification information.

"List of devices to be managed" is a list of devices which are connected to a network which includes the device management apparatus, and for each of which a management ID is issued.

The following describes preferred embodiments of the present disclosure.

(2) In the device management apparatus according to the present disclosure, in a case where the device from which the communicator has received the connection request has no management ID, but where the list of devices to be managed includes a device having the same device identification information, the controller may control the display to display a predetermined warning message indicating a possibility of a duplicate device.

With this configuration, in a case where a device having requested connection has no management ID issued by the device management apparatus, and where the list of devices to be managed includes a device having the same device identification information, the controller notifies a warning message indicating a possibility of the same device. Therefore, the device management apparatus is highly convenient for users.

(3) In the device management apparatus according to the present disclosure, in a case where the device from which the communicator has received the connection request has a management ID, and where the list of devices to be managed includes a device having the same management ID but having different device identification information, the controller may control the display to display a predetermined warning message indicating a possibility of connection from an unauthorized device.

With this construction, in a case where a device having requested connection has a management ID issued by the device management apparatus, and where the list of devices to be managed includes a device having the same management ID but different identification information, the controller notifies a warning message indicating a possibility of connection from an unauthorized device. Therefore, the device management apparatus is highly convenient for users.

(4) The device management apparatus according to the present disclosure may further include a device identification information setter that accepts setting of the device identification information, and the device identification information setter may accept setting in which any combination of information, among information acquirable from the device, is set as device identification information.

For example, "information acquirable from the device" may be a model name or a serial number, an IP address, a product number, or a series name of the device.

With this construction, judgment can be made as to whether the list of devices to be managed includes a device having the same identification information as the device having requested connection, based on voluntarily set device identification information. Therefore, the device management apparatus is highly convenient for users.

(5) The device management apparatus according to the present disclosure may further include an operation acceptor that accepts input of various types of instructions from a user, and in a case where the device from which the communicator has received the connection request has a management ID, and where the list of devices to be managed includes a device having a different management ID but having the same device identification information, the controller may control the display to display a predetermined warning message indicating a possibility of a duplicate device, and when the operation acceptor accepts input of an instruction affirming the duplicate device, the communicator may unify the management ID of the device from which the communicator has received the connection request, to the management ID of the device included in the list of devices to be managed.

With this construction, in a case where the device having requested connection has a management ID issued by the device management apparatus and where the list of devices to be managed includes a device having a different management ID but having the same identification information, the controller notifies a warning message indicating a possibility of the same device, and when a user instruction affirming the same device is accepted, the management ID of the device having requested connection is unified to the management ID of the device included in the list of devices to be managed. Therefore, the device management apparatus is highly convenient for users.

(6) The device management apparatus according to the present disclosure may further include an operation acceptor that accepts input of various types of instructions from a user, and in a case where the operation acceptor has accepted input of a reply indicating a possibility of connection from an unauthorized device, the controller may discard information received from the device from which the communicator has received the connection request.

With this construction, if a reply is made by a user, indicating a possibility of connection from an unauthorized device, after notification of a warning message indicating a possibility of connection from an unauthorized device, the information from the device having requested connection is discarded. Therefore, the device management apparatus is highly convenient for users.

The following details the present disclosure with reference to the drawings. The following description is exemplary in all aspects, and is not to be construed to limit the present disclosure.

First Embodiment

Schematic Configuration of Device Management System 100

The following describes, with reference to FIG. 1, a configuration of the device management system 100 that includes a device management apparatus according to the present disclosure and a digital multifunction peripheral 1. The digital multifunction peripheral 1 is an example of a device to be managed by the device management apparatus according to the present disclosure.

The device according to the present disclosure is not limited to the digital multifunction peripheral 1, and may be any type of device as long as the device is connectable via a wired or wireless network 3.

For example, the present disclosure is applicable to a personal computer (PC), a mobile device such as a smartphone, a television, and a digital versatile disk (DVD) recorder.

FIG. 1 is an explanatory diagram illustrating a schematic configuration of the device management system 100 that includes the device management apparatus 2 according to the present disclosure and the digital multifunction peripheral 1.

In the example of FIG. 1, the device management system 100 is constituted by digital multifunction peripherals 1A and 1B, which are connected via the wired or wireless network 3, a device management apparatus 2, and a network 3.

In the following description, the digital multifunction peripherals 1A and 1B are collectively referred to as a digital multifunction peripheral 1. In addition, the configuration illustrated in FIG. 1 is exemplary, and the device management system 100 may include any number and any type of devices.

The digital multifunction peripheral 1 is an apparatus, such as a multifunction machine and a multifunction peripheral (MFP), which digitally processes image data, and has a copy function, a printer function, a scanner function, and a facsimile function.

The device management apparatus 2 specifies a device such as the digital multifunction peripheral 1 via the network 3, and manages the device.

The network 3 is a wired or wireless network, which may be any network such as a LAN, a wide area network (WAN) such as the Internet, and a dedicated communication line.

Schematic Configuration of Digital Multifunction Peripheral 1

Figure 2:
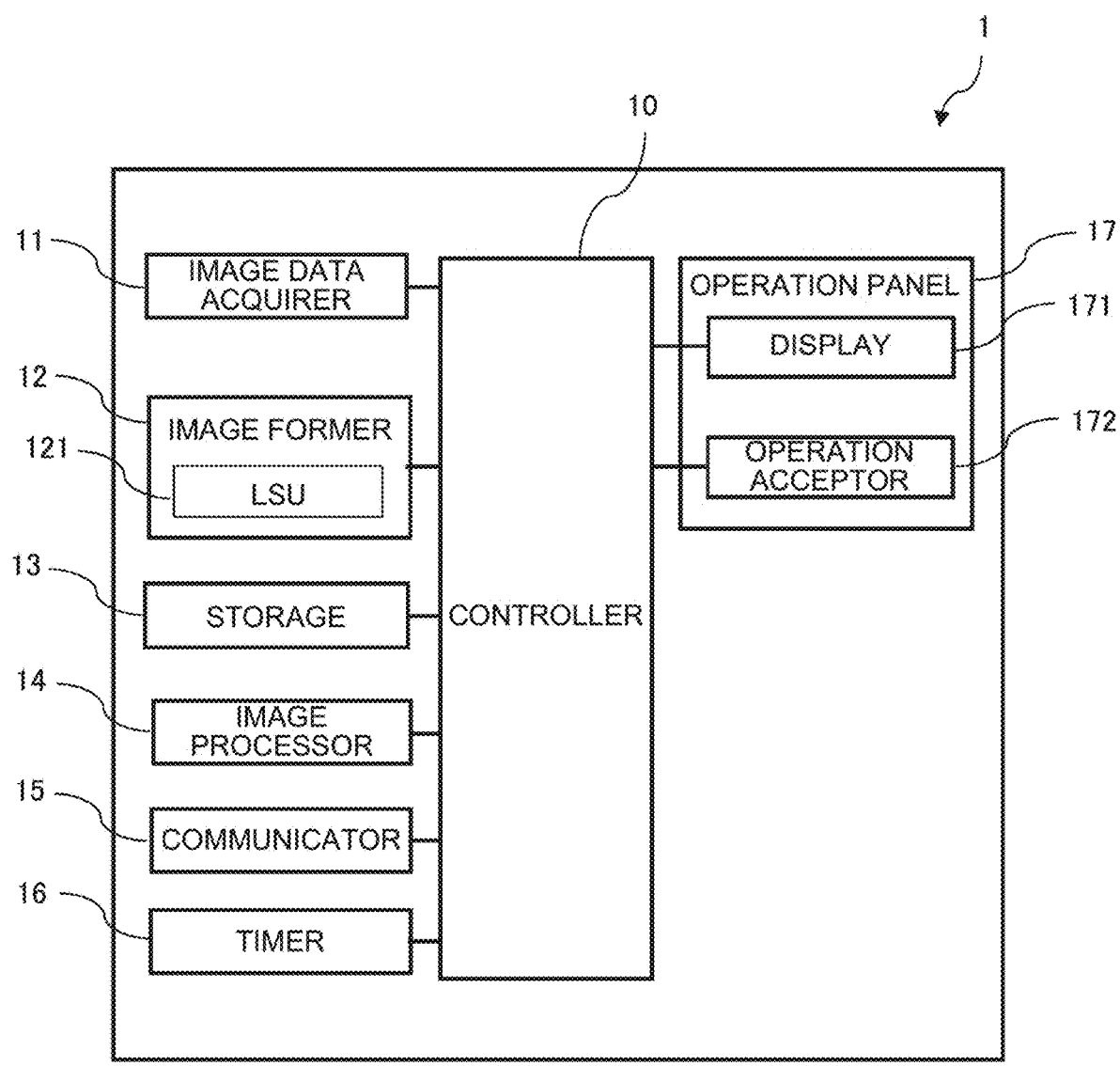
FIG. 2 is a block diagram illustrating a schematic configuration of a digital multifunction peripheral illustrated in FIG. 1.

Next, the following describes a schematic configuration of the digital multifunction peripheral 1, with reference to FIG. 2.

FIG. 2 is a block diagram illustrating a schematic configuration of the digital multifunction peripheral 1 illustrated in FIG. 1.

As illustrated in FIG. 2, the digital multifunction peripheral 1 according to the present disclosure includes a controller 10, an image data acquirer 11, an image former 12, a storage 13, an image processor 14, a communicator 15, a timer 16, and an operation panel 17.

The following describes each component of the digital multifunction peripheral 1.

The controller 10 comprehensively controls the digital multifunction peripheral 1, and includes a central processing unit (CPU), a random access memory (RAM), a read only memory (ROM), and various types of interface circuits, for example.

So as to control the entire operation of the digital multifunction peripheral 1, the controller 10 performs monitoring and control over the various loads, such as motors, clutches, and the operation panel 17, and detection for each sensor.

The image data acquirer 11 detects to read a document placed on a document platen, or a document conveyed from a document tray, converts the result into an appropriate electric signal, and generates image data.

The image former 12 is a section that prints and outputs, onto a sheet of paper, the image data generated by the image data acquirer 11 and processed by the image processor 14. The image former 12 includes a laser scanning unit (LSU) 121.

An LSU 121 is an apparatus that irradiates a surface of a photoconductor drum in a charged state, with laser light corresponding to image information made of a digital signal acquired by the image data acquirer 11, thereby to form an electrostatic latent image.

The storage 13 stores data required for execution of a job such as printing. The data specifically includes information related to a job, and image data.

The image processor 14 is a section that processes image data input from the image data acquirer 11, so as to be suited for outputting, such as enlarging and reducing, in accordance with an instruction from the operation acceptor 172.

The communicator 15 is a section that communicates with the device management apparatus 2, and other image forming apparatuses, mobile information terminals, information processing apparatuses, facsimile apparatuses, and the like, and transmits and receives, to and from these external apparatuses, various types of information such as related to e-mail and facsimile communication.

The timer 16 is a section that measures time, and acquires the time via a built-in clock or the network 3, for example.

The operation panel 17 is constituted by a display panel made of a liquid crystal panel or the like, and an electrostatic capacitive touch panel which is overlaid on the display panel. The electrostatic capacitive touch panel detects a position at which a finger touches. The operation panel 17 includes a display 171 and an operation acceptor 172.

The display 171 is a section that displays various types of information. For example, the display 171 is constituted by a cathode ray tube (CRT) display, a liquid crystal display, an electro-luminescence (EL) display, or the like, and is a display apparatus, such as a monitor and a line display, on which an operating system or application software displays electronic data such as processing state.

The controller 10 performs operation and state display of the digital multifunction peripheral 1 via the display 171.

The operation acceptor 172 serves as an interface to operate the digital multifunction peripheral 1, and is a section that accepts a user instruction.

Schematic Configuration of Device Management Apparatus 2

Figure 3:
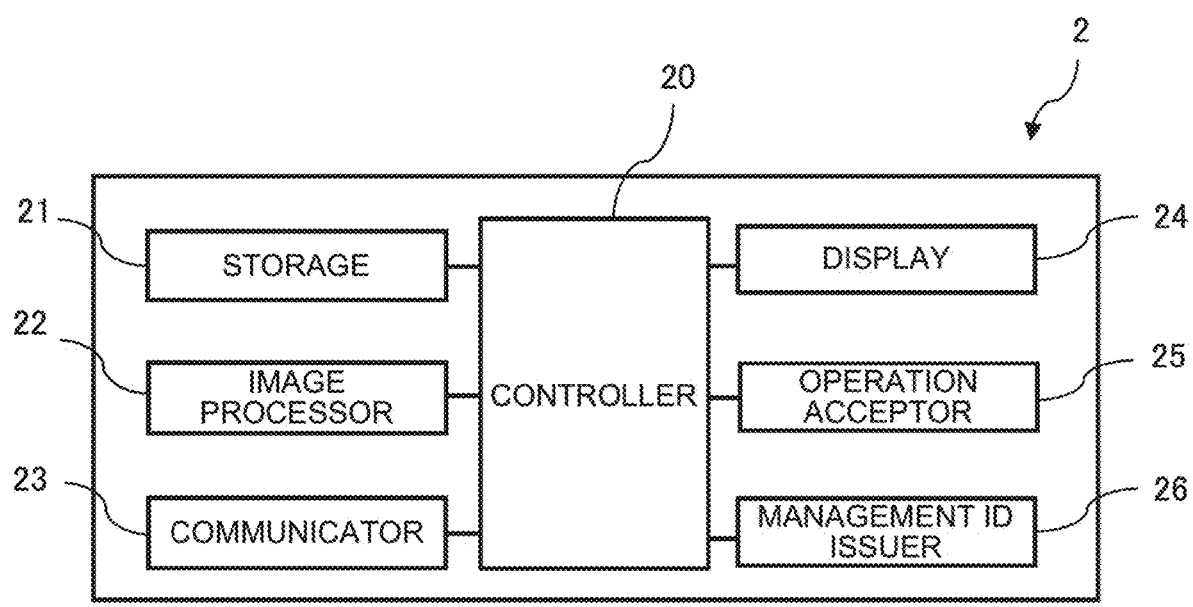
FIG. 3 is a block diagram illustrating a schematic configuration of the device management apparatus illustrated in FIG. 1.

Next, the following describes a schematic configuration of the device management apparatus 2, with reference to FIG. 3.

FIG. 3 is a block diagram illustrating a schematic configuration of the device management apparatus 2 illustrated in FIG. 1.

As illustrated in FIG. 3, the device management apparatus 2 according to the present disclosure includes a controller 20, a storage 21, an image processor 22, a communicator 23, a display 24, an operation acceptor 25, and a management ID issuer 26.

The controller 20 comprehensively controls the device management apparatus 2, and includes a CPU, a RAM, a ROM, and various types of interface circuits, for example.

The storage 21 is an element or a storage medium for storing information, a control program, and the like, which are required to realize various functions of the device management apparatus 2. For example, the storage 21 is a storage medium such as a semiconductor element such as a RAM and a ROM, a hard disk, a flash storage, and a solid state drive (SSD).

The storage 21 stores such information as users' log-in names and passwords, which are stored for user authentication.

The image processor 22 is a section that performs processing to convert image data into an appropriate electric signal, so as to be suited for outputting, such as enlarging and reducing.

The communicator 23 is a section that communicates, via the network 3, with the external digital multifunction peripheral 1 and transmits an instruction related to a job such as printing, document image data, and the like.

The display 24 is a section that displays various types of information. For example, the display 24 is constituted by a cathode ray tube (CRT) display, a liquid crystal display, an electro-luminescence (EL) display, or the like, and is a display apparatus, such as a monitor and a line display, on which an operating system or application software displays electronic data such as processing state.

The controller 20 performs operation and state display of the device management apparatus 2 via the display 24.

The operation acceptor 25 serves as an interface to operate the device management apparatus 2, and is a section that accepts a user instruction. The operation acceptor 25 is made of a keyboard layout including a plurality of keys. The operation acceptor 25 may include a touch panel, just as the digital multifunction peripheral 1.

The management ID issuer 26 is a section that issues a management ID to be assigned to a device, such as the digital multifunction peripheral 1, which is connected to the device management system 100 for the first time.

Problem in Device Management which a Known Device Management Apparatus 2 has

Figure 4:
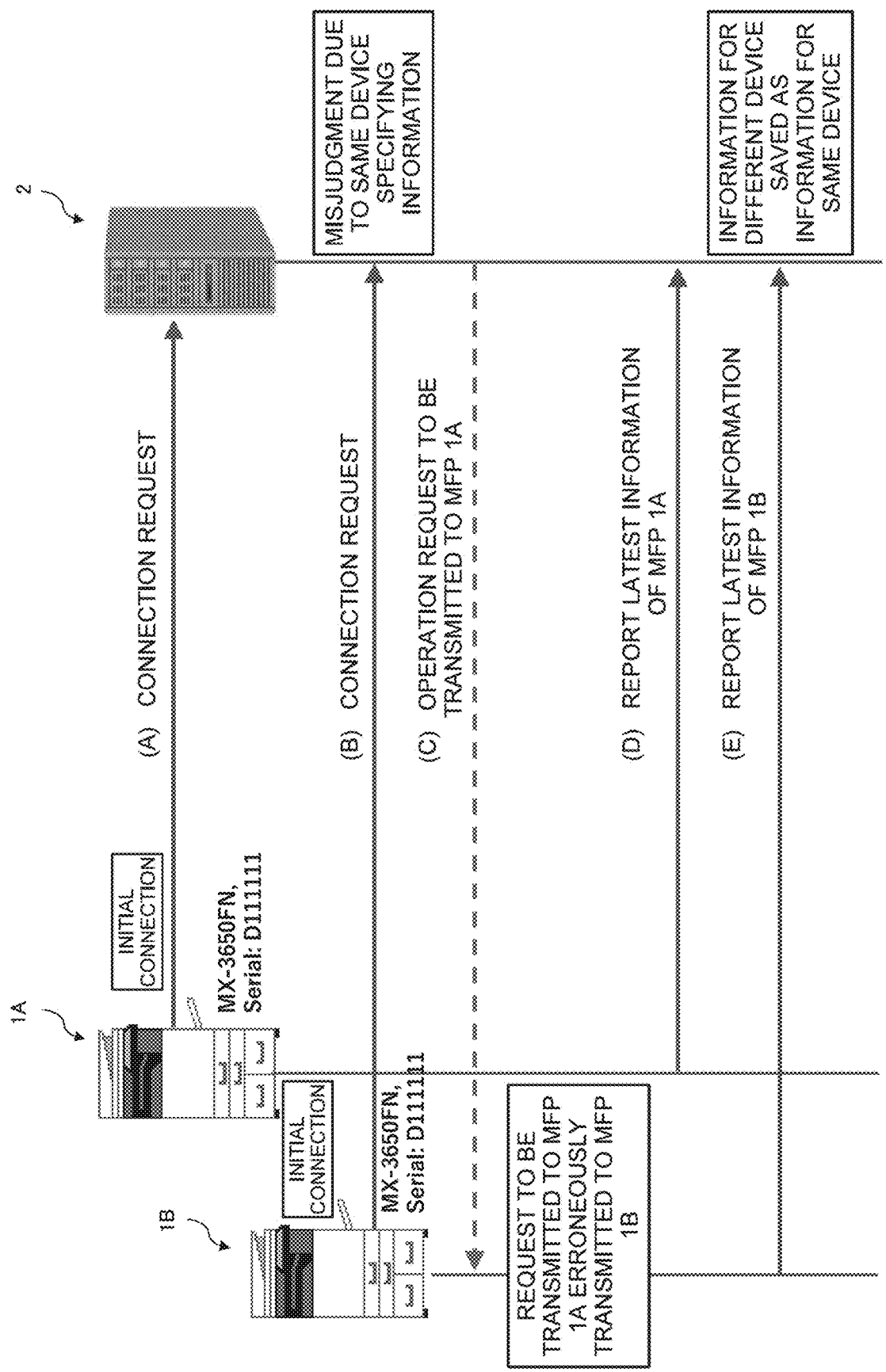
FIG. 4 is an explanatory diagram explaining a problem in device management which a known device management apparatus has.

Next, the following describes, with reference to FIG. 4, a problem in device management which a known device management apparatus 2 has.

FIG. 4 is an explanatory diagram explaining a problem in device management which a known device management apparatus 2 has.

FIG. 4 assumes a case in which the digital multifunction peripheral 1B is connected to the device management system 100 after the digital multifunction peripheral 1A is connected to the device management system 100. In this case, the digital multifunction peripherals 1A and 1B are assumed to have a same model name (MX-3650FN), and a same serial number (D111111).

In this case, when the digital multifunction peripheral 1A is connected to the device management system 100, the device management apparatus 2 receives a connection request from the digital multifunction peripheral 1A, as illustrated as FIG. 4(A).

Upon the connection request, so as to specify the digital multifunction peripheral 1A, the device management apparatus 2 acquires predetermined device specifying information, i.e., the model name (MX-3650FN), the serial number (D111111), and the management ID (if issued).

Subsequently, when the digital multifunction peripheral 1B is connected to the device management system 100, the device management apparatus 2 receives a connection request from the digital multifunction peripheral 1B, as illustrated as FIG. 4(B).

Information received upon the connection request includes device specifying information for specifying the digital multifunction peripheral 1B, i.e., the model name (MX-3650FN) and the serial number (D111111).

However, the digital multifunction peripheral 1B has completely the same device specifying information as that of the digital multifunction peripheral 1A. Therefore, the device management apparatus 2 may likely mistake the digital multifunction peripheral 1B as the same device as the digital multifunction peripheral 1A.

As a result, as illustrated as FIG. 4(C), an operation request to be transmitted to the digital multifunction peripheral 1A is erroneously transmitted to the digital multifunction peripheral 1B.

Assume also that, after the digital multifunction peripheral 1A reports latest information to the device management apparatus 2 as illustrated as FIG. 4(D), the digital multifunction peripheral 1B reports latest information to the device management apparatus 2 as illustrated as FIG. 4(E).

In this case, too, device management apparatus 2 may likely mistake these pieces of latest information as those of the same device, even though the digital multifunction peripheral 1B is a device completely different from the digital multifunction peripheral 1A.

In this way, when the digital multifunction peripherals 1A and 1B, being originally different devices, have duplicate device identification information for some reason, problems may arise, such as management inconsistency or misreception of information from an unintended device.

Figure 5:
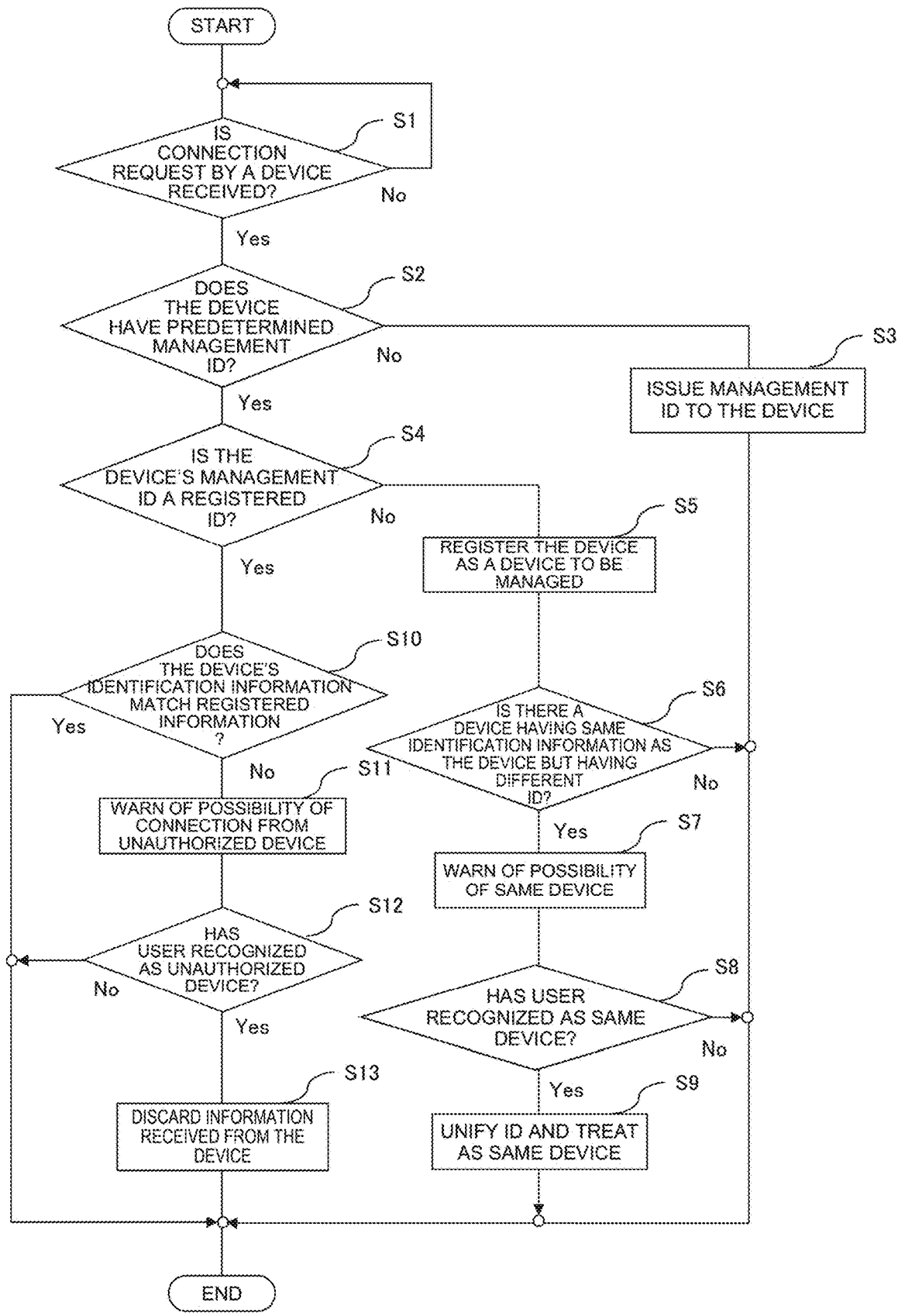
FIG. 5 is a flowchart illustrating a flow of device management processing in the device management apparatus illustrated in FIG. 1.

Flow of Device Management Processing in the Device Management Apparatus 2 According to the Present Disclosure Next, the following describes, with reference to FIG. 5, a flow of device management processing in the device management apparatus 2 according to the present disclosure.

FIG. 5 is a flowchart illustrating a flow of device management processing in the device management apparatus 2 illustrated in FIG. 1.

In step S1 in FIG. 5, the controller 20 of the device management apparatus 2 judges whether a connection request is received from a device (step S1).

When a connection request is received from a device (Yes in the judgment in step S1), in step S2, the controller 20 judges whether the device having requested connection has management ID information issued by the device management apparatus 2 (step S2).

Upon a device's connection request, the controller 20 also receives device specifying information of the device, including identification information, such as a model name and a serial number, and a management ID.

On the other hand, when a connection request is not received from a device (No in the judgment in step S1), the controller 20 repeatedly performs the judgment in step S1.

Subsequently, in step S2, when the device having requested connection does not have any ID information issued by the device management apparatus 2 (No in the judgment in step S2), in step S3, the controller 20 issues a management ID to the device (step S3).

In this way, a device that is connected to the device management system 100 for the first time is assigned a management ID.

After this, the controller 20 ends the processing.

Figure 6:
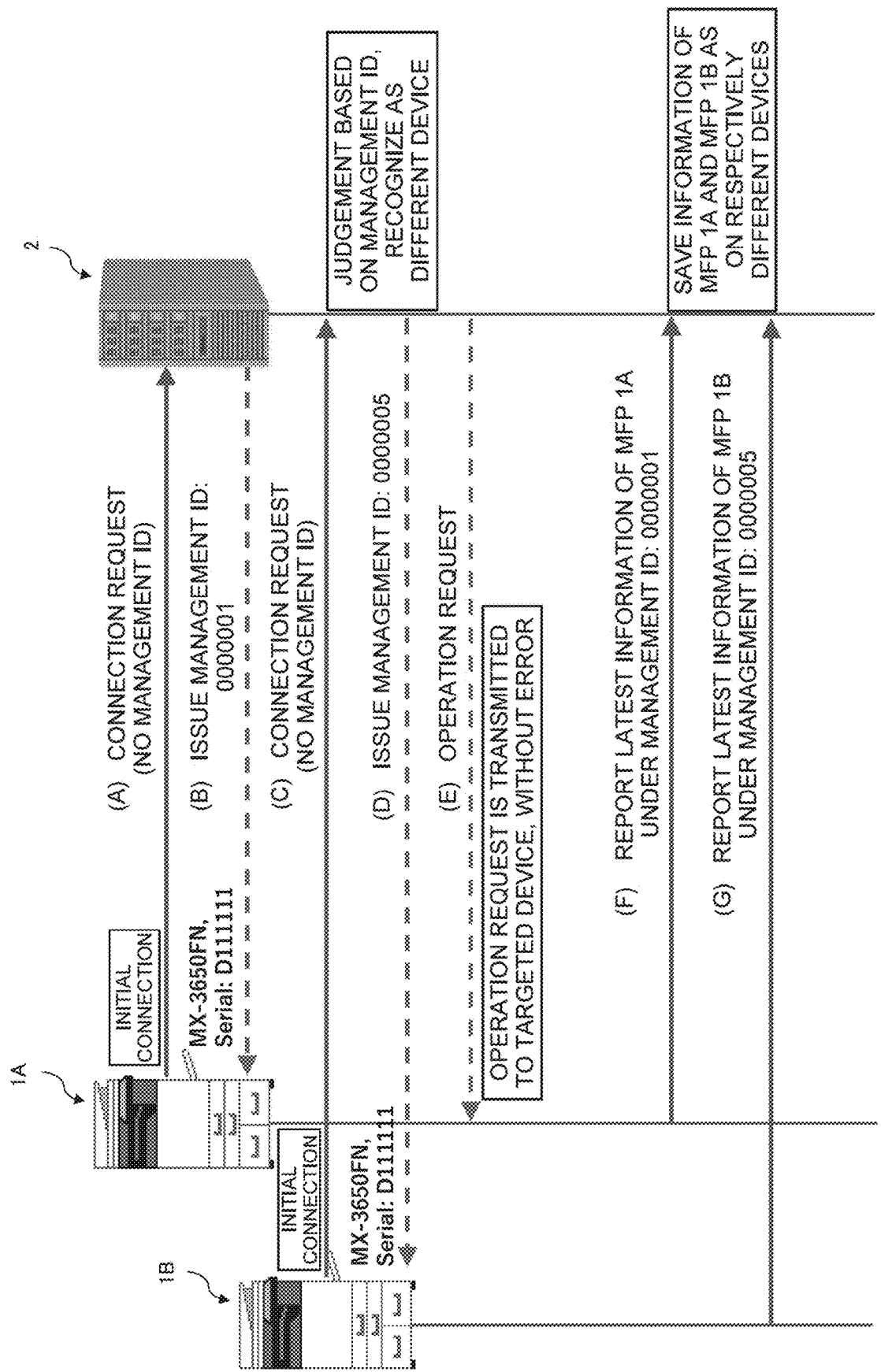
FIG. 6 is an explanatory diagram illustrating an example of a flow of device management processing in the device management apparatus illustrated in FIG. 1.

FIG. 6 is an explanatory diagram illustrating an example of a flow of device management processing in the device management apparatus 2 illustrated in FIG. 1.

FIG. 6 assumes a case in which the digital multifunction peripheral 1B is connected to the device management system 100 after the digital multifunction peripheral 1A is connected to the device management system 100. It is assumed that the digital multifunction peripherals 1A and 1B have a same model name (MX-3650FN), and a serial number (D111111), but neither has been assigned a management ID.

In this case, when the digital multifunction peripheral 1A is connected to the device management system 100, the device management apparatus 2 receives a connection request from the digital multifunction peripheral 1A, as illustrated as FIG. 6(A).

When connecting to the digital multifunction peripheral 1A for the first time, the device management apparatus 2 acquires, as device specifying information, identification information (the model name: MX-3650FN, the serial number: D111111), but not a management ID, because no management ID has been issued yet.

Therefore, as illustrated as FIG. 6(B), the device management apparatus 2 causes the management ID issuer 26 to issue a management ID (0000001) to the digital multifunction peripheral 1A, and causes the communicator 23 to transmit the management ID (0000001).

Subsequently, when the digital multifunction peripheral 1B is connected to the device management system 100, the device management apparatus 2 receives a connection request from the digital multifunction peripheral 1B, as illustrated as FIG. 6(C).

When connecting to the digital multifunction peripheral 1B for the first time, the device management apparatus 2 acquires identification information (the model name: MX-3650FN, the serial number: D111111), but not a management ID, because no management ID has been issued yet.

Therefore, as illustrated as FIG. 6(D), the device management apparatus 2 causes the management ID issuer 26 to issue a management ID (0000005) to the digital multifunction peripheral 1B, and causes the communicator 23 to transmit the management ID (0000005).

As a result, as illustrated as FIG. 6(E), even if the device management apparatus 2 transmits an operation request to the digital multifunction peripheral 1A, the management ID enables to distinguish the digital multifunction peripheral 1A from the digital multifunction peripheral 1B. Therefore, such operation request is transmitted to the digital multifunction peripheral 1A without error.

It is also assumed that, after the digital multifunction peripheral 1A reports latest information to the device management apparatus 2 as illustrated as FIG. 6(F), the digital multifunction peripheral 1B reports latest information to the device management apparatus 2 as illustrated as FIG. 6(G).

In this case, too, the management ID enables to distinguish the digital multifunction peripheral 1B from the digital multifunction peripheral 1A. Therefore, the device management apparatus 2 can save these pieces of latest information as those of the digital multifunction peripherals 1A and 1B, respectively, without error.

Subsequently, in step S2 in FIG. 5, when the device having requested connection has ID information issued by the device management apparatus 2 (Yes in the judgment in step S2), in step S4, the controller 20 judges whether the management ID of the device is a registered ID (step S4).

If the management ID of the device is not a registered ID (No in the judgment in step S4), in step S5, the controller 20 registers the device as a device to be managed (step S5).

In the subsequent step S6, the controller 20 judges whether there is another device which has the same identification information as that of the device having requested connection, but which has a different management ID from that of the device having requested connection (step S6).

If there is such another device (Yes in the judgment in step S6), in step S7, the controller 20 controls the display 24 to display a warning message indicating a possibility that the device having requested connection is the same as another device having a different management ID (step S7).

On the other hand, if there is no such another device (No in the judgment in step S6), the controller 20 ends the processing.

FIGS. 7A and 7B are respectively an explanatory diagram illustrating an example of a connected device list displayed on the display 24 of the device management apparatus 2 illustrated in FIG. 1. FIG. 7A illustrates an example of a screen on which a mouse cursor is not overlayed on a warning icon, whereas FIG. 7B is an explanatory diagram illustrating an example of a warning message to be displayed when a mouse cursor is overlayed on the warning icon.

In FIGS. 7A and 7B, a list of devices having requested connection to the device management apparatus 2 is displayed, in an order in which the connection request is accepted.

In this list, both of a device under the management ID (0000001) and a device under the management ID (0000005) have the same serial number, which is (D111111).

Therefore, as illustrated as FIG. 7(A), a warning icon to warn a user (mark "!" in a triangle in an example of FIGS. 7A and 7B) is displayed next to the management ID (0000001) and the management ID (0000005).

Here, when a user overlays a mouse cursor on the warning icon, a warning message is displayed on the display 24, indicating "SAME DEVICE IS LIKELY REGISTERED UNDER DIFFERENT MANAGEMENT ID. PLEASE CLICK WARNING ICON FOR MORE DETAILS." as illustrated in FIG. 7B.

Figure 8:
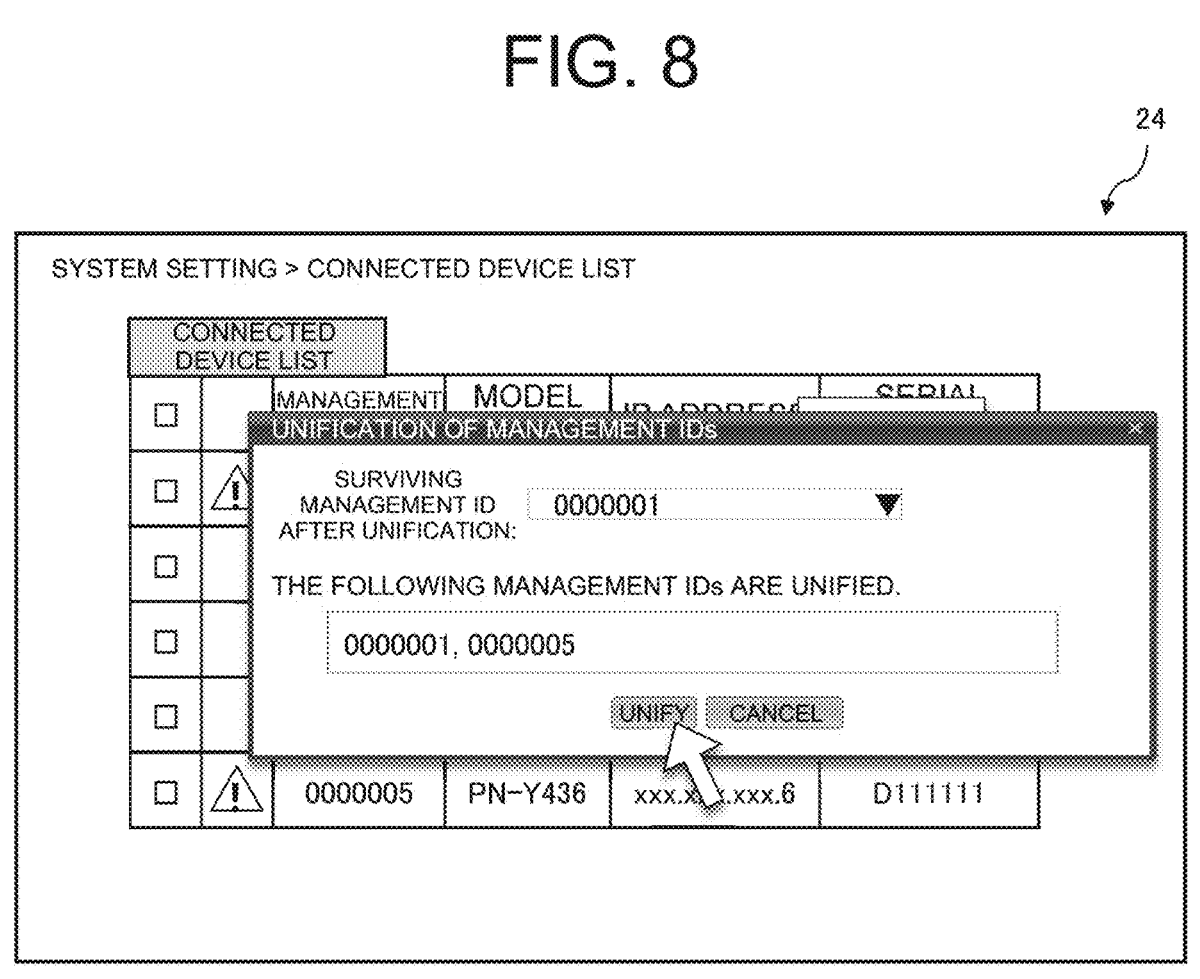

FIG. 8 is an explanatory diagram illustrating an example of a message in unifying management IDs, to be displayed on the display 24 of the device management apparatus 2 illustrated in FIG. 1.

When a user clicks the warning icon on the screen in FIG. 8, a message under the title of "UNIFICATION OF MANAGEMENT IDs" is displayed on the display 24, indicating "THE FOLLOWING MANAGEMENT IDs ARE UNIFIED. 0000001,0000005" with "SURVIVING MANAGEMENT ID AFTER UNIFICATION: 0000001", as illustrated in FIGS. 10A and 10B.

Further, in the example of FIG. 8, a user may designate a different management ID (0000005) as the unifying destination, by clicking a reverse triangular mark (▼) next to "SURVIVING MANAGEMENT ID AFTER UNIFICATION".

A user can select whether to unify the management IDs, by selecting either "UNIFY" button or "CANCEL" button.

In the example of FIG. 8, when the "UNIFY" button is selected, the device under the management ID (0000005) is unified to the device under the management ID (0000001), as being the same device.

On the other hand, when the "CANCEL" button is selected, the device under the management ID (0000001) and the device under the management ID (0000005) are registered as respectively different devices.

Next, in step S8 in FIG. 5, when a user recognizes that the device having requested connection is the same as the device having a different management ID (Yes in the judgment in step S8), in step S9, the controller 20 unifies the management IDs of the both devices to treat the devices as the same device (step S9), and ends the processing.

On the other hand, when the user recognizes that the devices are not the same (No in the judgment in step S8), the controller 20 ends the processing.

Figure 9:
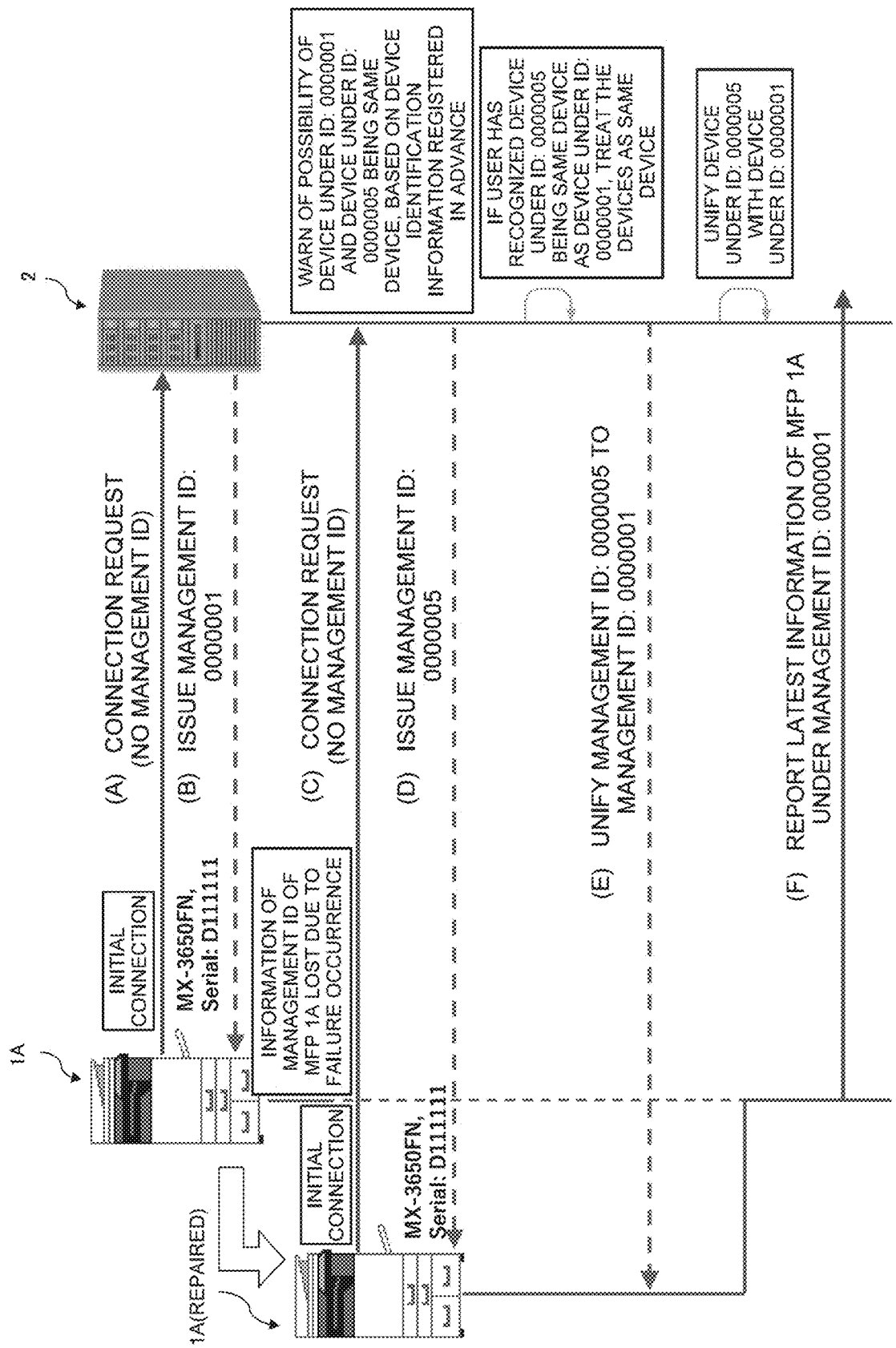
FIG. 9 is an explanatory diagram illustrating an example of a flow of device management processing in the device management apparatus illustrated in FIG. 1.

FIG. 9 is an explanatory diagram illustrating an example of a flow of device management processing in the device management apparatus 2 illustrated in FIG. 1.

In FIG. 9, assume a case in which, after the digital multifunction peripheral 1A is connected to the device management system 100, a failure occurs and the management ID issued and registered in the digital multifunction peripheral 1A is lost. The digital multifunction peripheral 1A is assumed to have a model name (MX-3650FN) and a serial number (D111111).

In this case, when the digital multifunction peripheral 1A is connected to the device management system 100, the device management apparatus 2 receives a connection request from the digital multifunction peripheral 1A, as illustrated as FIG. 9(A).

When connecting to the digital multifunction peripheral 1A for the first time, the device management apparatus 2 acquires identification information (the model name: MX-3650FN, the serial number: D111111), but not a management ID, because no management ID has been issued yet.

Therefore, as illustrated as FIG. 9(B), the device management apparatus 2 causes the management ID issuer 26 to issue a management ID (0000001) to the digital multifunction peripheral 1A, and causes the communicator 23 to transmit the management ID (0000001).

It is also assumed that thereafter, due to occurrence of a failure, the management ID (0000001), having been issued and registered in the digital multifunction peripheral 1A, has been lost.

In this case, when the digital multifunction peripheral 1A is connected to the device management system 100, the device management apparatus 2 receives a connection request from the digital multifunction peripheral 1A, as illustrated as FIG. 9(C).

So as to specify the digital multifunction peripheral 1A, the device management apparatus 2 acquires identification information (the model name: MX-3650FN, the serial number: D111111), but not a management ID, because the management ID has been lost.

Therefore, as illustrated as FIG. 9(D), the device management apparatus 2 causes the management ID issuer 26 to issue a management ID (0000005) to the digital multifunction peripheral 1A, and causes the communicator 23 to transmit the management ID (0000005).

Here, there is a digital multifunction peripheral 1A under an already registered ID (the management ID: 0000001), which has the same identification information as this device (namely, the model name: MX-3650FN, the serial number: D111111). Thus, the display 24 displays a warning message to the user, indicating a possibility of the same device.

Thereafter, when a user instruction is accepted indicating that the management IDs should be unified because the devices are the same, the management ID (0000005) of the digital multifunction peripheral 1A is unified to the already-registered management ID (0000001), as illustrated as FIG. 9(E).

As a result, as illustrated as FIG. 9(F), when the digital multifunction peripheral 1A reports latest information to the device management apparatus 2, the latest information is reported to the device management apparatus 2, under the management ID (0000001), which is before occurrence of the failure.

In this way, even when information about a management ID is lost due to occurrence of a failure or the like, the management ID of the repaired digital multifunction peripheral 1 is unified to the management ID of the digital multifunction peripheral 1 in the list of devices to be managed. Therefore, the device management apparatus 2 is highly convenient for users.

On the other hand, in the judgment of step S4 in FIG. 5, if the management ID of the device having requested connection is a registered ID (Yes in the judgment in step S4), in step S10, the controller 20 judges whether the identification information of the device matches registered information (step S10).

When the identification information of the device does not match registered information (No in the judgment in step S10), in step S11, the controller 20 controls the display 24 to display a warning message indicating a possibility of connection from an unauthorized device (step S11).

In the subsequent step S12, the controller 20 judges whether the user has recognized that the device is an unauthorized device (Step S12).

When the user has recognized that the device is an unauthorized device (Yes in the judgment in step S12), in step S13, the controller 20 discards information received from the device (step S13), and ends the processing.

On the other hand, in step S10, when the identification information of the device matches registered information (Yes in the judgment in step S10), the controller 20 ends the processing.

In addition, also in a case where, in step S12, the user has recognized that the device is not an unauthorized device (No in the judgment in step S12), the controller 20 ends the processing.

FIGS. 10A and 10B are respectively an explanatory diagram illustrating an example of a connected device list displayed on the display 24 of the device management apparatus 2 illustrated in FIG. 1. FIG. 10A illustrates an example of a screen on which a mouse cursor is not overlayed on a warning icon, whereas FIG. 10B is an explanatory diagram illustrating an example of a warning message to be displayed when a mouse cursor is overlayed on the warning icon.

In FIGS. 10A and 10B, a list of devices having requested connection to the device management apparatus 2 is displayed, in an order in which the connection request is accepted.

In this list, the first device and the second device in the list have the same management ID and the same model name (the management ID: 0000001, the model name: PN-Y436), but have respectively different serial numbers (D111111, D111112).

Therefore, as illustrated in FIG. 10A, a warning icon to warn a user (mark "X" in a circle in an example of FIGS. 10A and 10B) is displayed next to the management ID (0000001) of the first device and the second device in the list.

Here, when a user overlays a mouse cursor on the warning icon, a warning message is displayed on the display 24, indicating "THERE IS A POSSIBILITY OF ACCESS FROM UNAUTHORIZED DEVICE. PLEASE CLICK WARNING ICON FOR MORE DETAILS." as illustrated in FIG. 10B.

Figure 11:
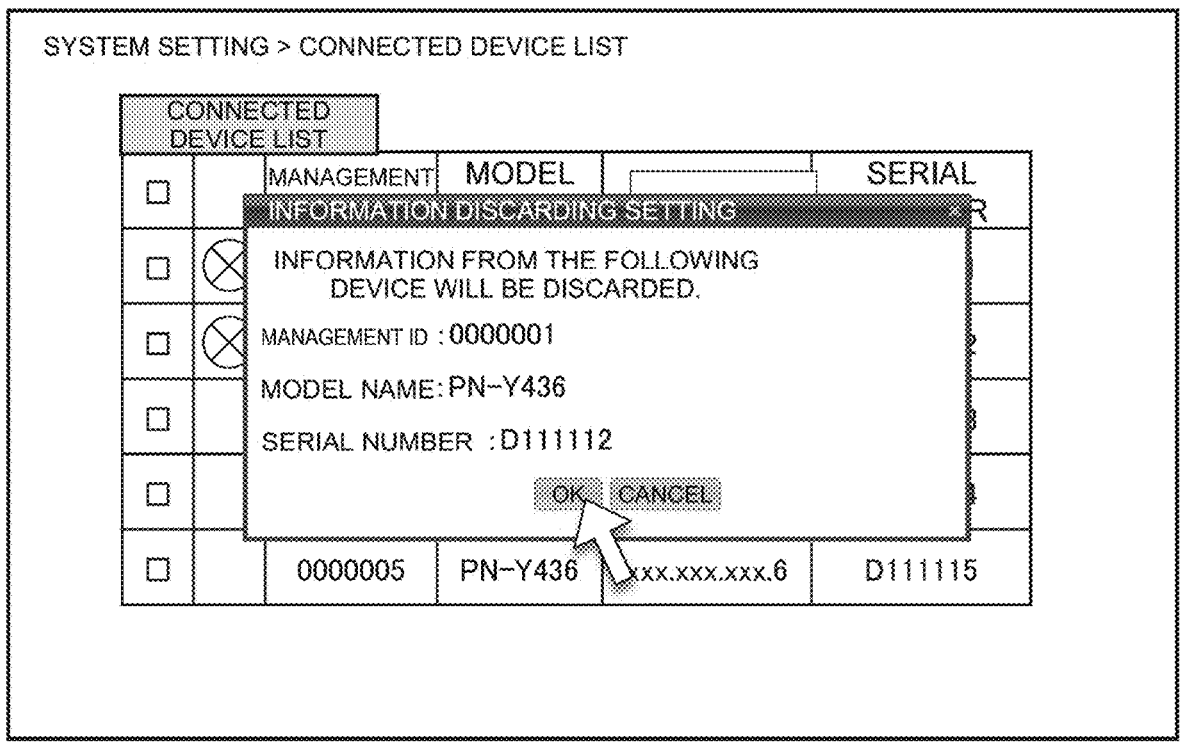
FIG. 11 is an explanatory diagram illustrating an example of a message in setting information discarding, to be displayed on the display of the device management apparatus illustrated in FIG. 1.

FIG. 11 is an explanatory diagram illustrating an example of a message in setting information discarding, to be displayed on the display 24 of the device management apparatus 2 illustrated in FIG. 1.

When a user clicks the warning icon on the screen in FIGS. 10A and 10B, a message under the title of "INFORMATION DISCARDING SETTING" is displayed on the display 24, indicating "INFORMATION FROM THE FOLLOWING DEVICE WILL BE DISCARDED." and "MANAGEMENT ID: 0000001, MODEL NAME: PN-Y436, SERIAL NUMBER: D111112", as illustrated in FIG. 11.

A user can select whether to discard the information, by selecting either "OK" button or "CANCEL" button.

In the example of FIG. 11, when the "OK" button is selected, the information from the device having the serial number (D111112) is discarded.

On the other hand, when the "CANCEL" button is selected, the information from the device is not discarded, but is unified to the information under the management ID (0000001).

Figure 12:
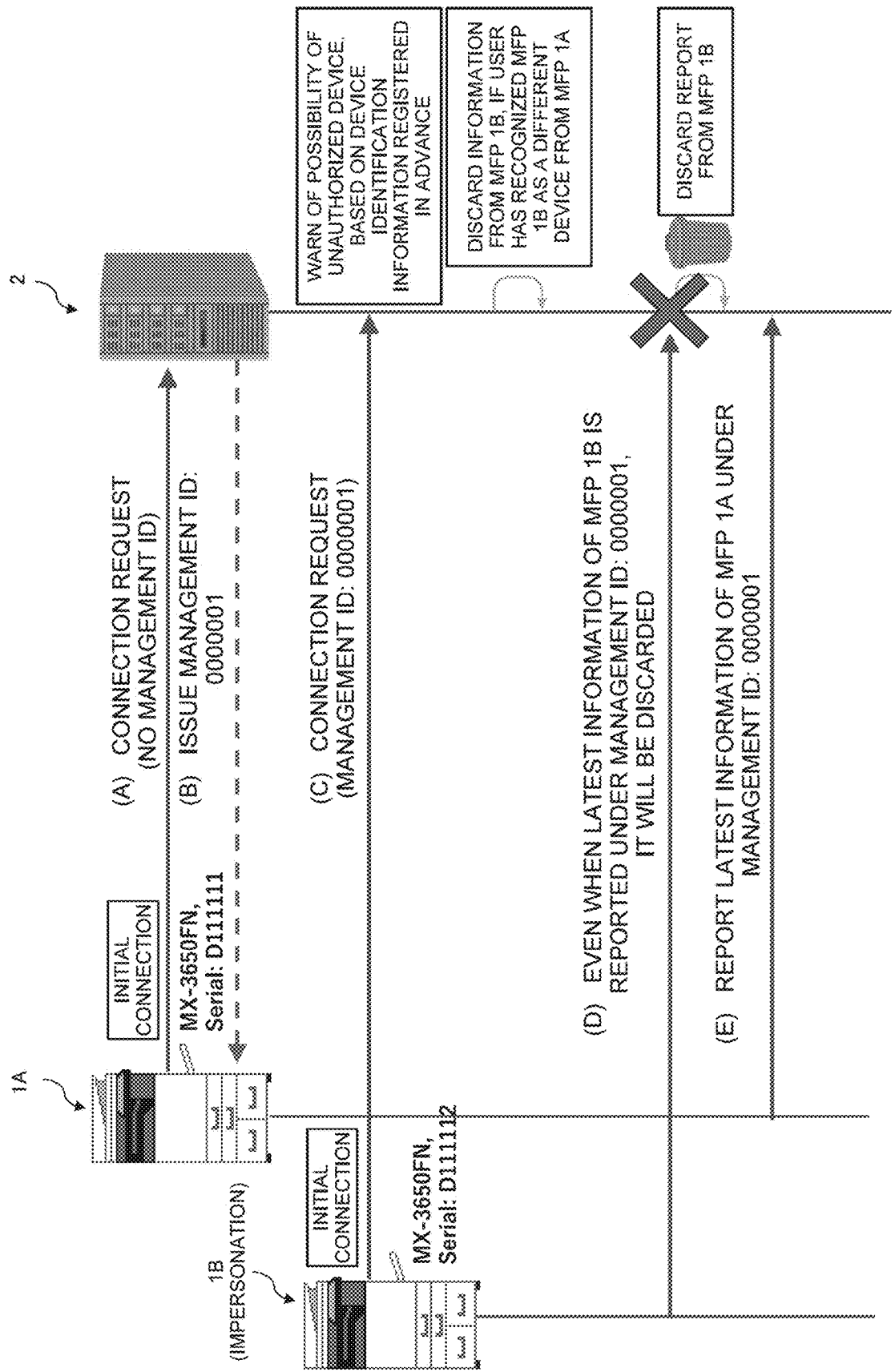
FIG. 12 is an explanatory diagram illustrating an example of a flow of device management processing in the device management apparatus illustrated in FIG. 1.

FIG. 12 is an explanatory diagram illustrating an example of a flow of device management processing in the device management apparatus 2 illustrated in FIG. 1.

FIG. 12 assumes a case in which after the digital multifunction peripheral 1A is connected to the device management system 100, a digital multifunction peripheral 1B, impersonating the digital multifunction peripheral 1A, is connected to the device management system 100 for unfair purpose.

The digital multifunction peripheral 1A and the digital multifunction peripheral 1B have the same management ID and the same model name (the management ID: 0000001, the model name: PN-Y436), but have respectively different serial numbers (D111111, D111112).

In this case, when the digital multifunction peripheral 1A is connected to the device management system 100, the device management apparatus 2 receives a connection request from the digital multifunction peripheral 1A, as illustrated as FIG. 12(A).

When connecting to the digital multifunction peripheral 1A for the first time, the device management apparatus 2 acquires identification information (the model name: MX-3650FN, the serial number: D111111), but not a management ID, because no management ID has been issued yet.

Therefore, as illustrated as FIG. 12(B), the device management apparatus 2 causes the management ID issuer 26 to issue a management ID (0000001) to the digital multifunction peripheral 1A, and causes the communicator 23 to transmit the management ID (0000001).

Subsequently, when the digital multifunction peripheral 1B, impersonating the digital multifunction peripheral 1A, is connected to the device management system 100 for unfair purpose, the device management apparatus 2 receives a connection request from the digital multifunction peripheral 1B, as illustrated as FIG. 12(C).

So as to specify the digital multifunction peripheral 1B, the device management apparatus 2 acquires identification information (the model name: MX-3650FN, the serial number: D111112), and the management ID (0000001).

The digital multifunction peripheral 1B has the same management ID (0000001) and the same model name (MX-3650FN) as those of the digital multifunction peripheral 1A under the already registered ID, but has a different serial number (D111112) from that of the digital multifunction peripheral 1A. Thus, the display 24 displays a warning message to the user, indicating a possibility of an unauthorized device.

Thereafter, when an instruction from the user is accepted indicating that the information from the digital multifunction peripheral 1B should be discarded because the device is an unauthorized device, even if the digital multifunction peripheral 1B reports latest information under the management ID (0000001) to the device management apparatus 2, the report is discarded, as illustrated as FIG. 12(D).

On the other hand, as illustrated as FIG. 12(E), when the digital multifunction peripheral 1A reports latest information under the management ID (0000001) to the device management apparatus 2, the report is accepted.

In this way, when the digital multifunction peripheral 1 having requested connection includes the management ID issued by the device management apparatus 2, and when any device having the same management ID but different identification information exists in the list of devices to be managed, a warning message is notified, indicating a possibility of connection from an unauthorized device.

Then, if a reply is made by a user, indicating a possibility of connection from an unauthorized device, after notification of a warning message indicating a possibility of connection from an unauthorized device, the information from digital multifunction peripheral 1 having requested connection is discarded. Therefore, the device management apparatus 2 is highly convenient for users.

Figure 13:
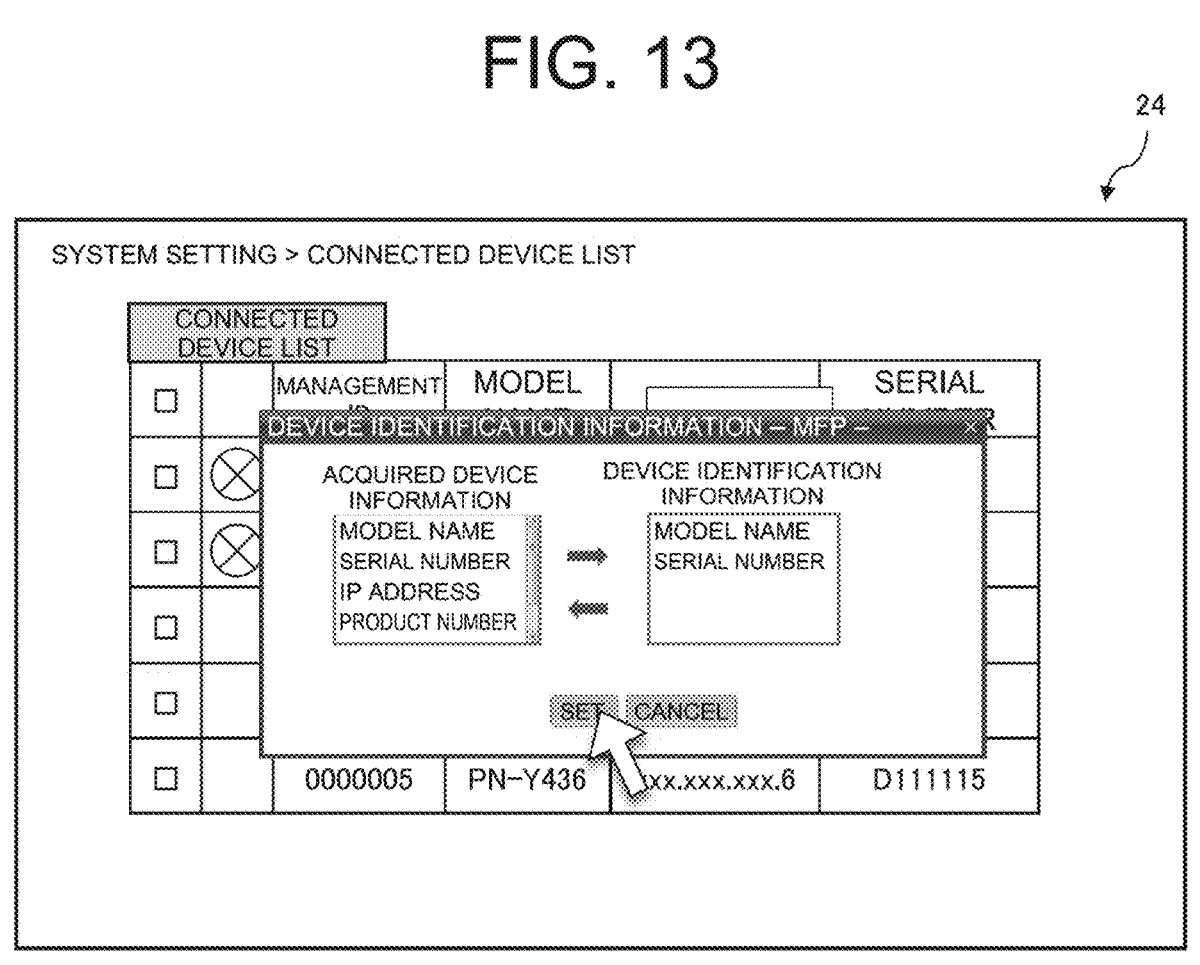

FIG. 13 is an explanatory diagram illustrating an example of setting of device identification information to be displayed on the display 24 of the device management apparatus 2 illustrated in FIG. 1.

So far, a model name and a serial number are used as the device identification information. However, out of the information acquirable from the device, information which is voluntarily set by a user, may be used as the device identification information.

FIG. 13 illustrates an example in which, under the title "DEVICE IDENTIFICATION INFORMATION—MFP—", two pieces of information, i.e., "DEVICE IDENTIFICATION INFORMATION: MODEL NAME, SERIAL NUMBER" are selected and set by a user, among four pieces of information, i.e., "ACQUIRED DEVICE INFORMATION: MODEL NAME, SERIAL NUMBER, IP ADDRESS, PRODUCT NUMBER".

The device identification information may be configured to be displayed when a user clicks (or right-clicks) the model name or the serial number of the device displayed on the connected device list.

In this way, judgment can be made as to whether the list of devices to be managed includes a digital multifunction peripheral 1 having the same identification information as the digital multifunction peripheral 1 having requested connection, based on the voluntarily set device identification information. Therefore, the device management apparatus 2 is highly convenient for users.

The preferred embodiments of the present disclosure include any combination of some of the above-described plurality of embodiments. The present disclosure includes various modifications, in addition to the above-described embodiments. The modifications should be construed to be included in the scope of the present disclosure. The present disclosure shall include all meanings equivalent to the scope of claims and all modifications within the scope.

What is claimed is:

1. A device management apparatus that manages an external device connected via a network, the device management apparatus comprising:
   a management identification (ID) issuer that issues a unique management ID to the external device;
   a storage that stores device specifying information of the external device, the device specifying information including the unique management ID and predetermined device identification information;
a display that displays, in a list of devices to be managed, the external device to which the unique management ID is issued; and
a controller comprising at least one processor configured to:
transmit and receive various types of data to and from devices,
accept input of various types of instructions from a user, and
control the management ID issuer, the storage, and the display, wherein
when the controller has received a connection request from the external device via the network, the controller determines whether the external device has a management ID based on the device specifying information acquired from the external device, and if the external device has no management ID, the controller controls the management ID issuer to issue the unique management ID transmits the unique management ID to the external device,
in a case that the external device from which the controller has received the connection request has the management ID, and the list of devices to be managed includes a device having a different management ID but having the same device identification information, the controller controls the display to display a predetermined warning message indicating a possibility of having a duplicate device in the network, and when the controller accepts input of an instruction affirming the duplicate device, the controller unifies the management ID of the external device, from which the controller has received the connection request, with the management ID of the external device included in the list of devices to be managed.

2. The device management apparatus according to claim 1, wherein
in a case that the device, from which the controller has received the connection request has no management ID, and the list of devices to be managed includes a device having the same device identification information, the controller further controls the display to display a second predetermined warning message indicating the possibility of having the duplicate device in the network.

3. The device management apparatus according to claim 1, wherein
in a case that the device from which the controller has received the connection request has the management ID, and the list of devices to be managed includes a device having the same management ID but having different device identification information, the controller further controls the display to display a third predetermined warning message indicating a possibility of having a connection with an unauthorized device in the network.

4. The device management apparatus according to claim 3,
wherein
in a case that the controller has accepted input of a reply indicating the possibility of having the connection with the unauthorized device, the controller discards information received from the device from which the controller has received the connection request.

5. The device management apparatus according to claim 1, wherein
the controller is further configured to:
accept a setting of the device identification information, and
the setting comprises any combination of information, among information acquirable from the device, to be set as the device identification information.

6. A device management method that manages an external device connected via a network, the device management method comprising:
issuing a unique management ID to the external device;
storing device specifying information of the external device, the device specifying information including the unique management ID and predetermined device identification information;
displaying, in a list of devices to be managed, the external device for which the unique management ID is issued;
when a connection request is received from the external device via the network, determining whether the external device has a management ID based on the device specifying information acquired from the external device, and if the external device has no management ID, issue a issuing the unique management ID and transmitting the new management ID to the external device;
in a case that the external device, from which the connection request is received, has the management ID, and the list of devices to be managed includes a device having a different management ID but having the same device identification information, displaying a predetermined warning message indicating a possibility of having a duplicate device in the network; and
when an input of an instruction affirming the duplicate device is accepted, unifying the management ID of the external device, from which the connection request is received, with the management ID of the external device included in the list of devices to be managed.

* * * * *